(12) United States Patent
Hart (10) Patent No.: US 7,565,864 B2
(45) Date of Patent: Jul. 28, 2009

(54) FOOD TRAY INSERT FOR HOLDING TACOS (75) Inventor: William L. Hart, Manchaca, TX (US)

(73) Assignee: Hart Family Innovations, Ltd., Manchaca, TX (US)

( * ) Notice: Subject to any disclaimer, the term of this patent is extended or adjusted under 35 U.S.C. 154(b) by 626 days.

(21) Appl. No.: 11/332,128

(22) Filed: Jan. 13, 2006

(65) Prior Publication Data

US 2007/0163449 A1 Jul. 19, 2007

(51) Int. Cl.
A47J 43/20 (2006.01)
B65D 1/34 (2006.01)
B65D 85/36 (2006.01)

(52) U.S. Cl. .................... 99/426; 206/558; 206/562; 206/563; 206/564

(58) Field of Classification Search .................. None
See application file for complete search history.

(56) References Cited

U.S. PATENT DOCUMENTS

| 158,858 | A | * | 1/1875 | Mitchell | 99/450 |
|---|---|---|---|---|---|
| 471,134 | A | * | 3/1892 | Noland | 99/446 |
| 3,851,789 | A | | 12/1974 | Case et al. | |
| 3,876,130 | A | | 4/1975 | Haase | |
| 3,935,962 | A | | 2/1976 | Schubert et al. | |
| 3,968,921 | A | | 7/1976 | Jewell | |
| 4,004,501 | A | * | 1/1977 | Guerrero | 99/426 |
| 4,079,880 | A | | 3/1978 | Edwards | |
| 4,559,869 | A | * | 12/1985 | Hogan | 99/426 |
| 4,573,579 | A | * | 3/1986 | Murdick et al. | 206/525 |
| 4,746,010 | A | | 5/1988 | Fournier | |
| 4,832,208 | A | * | 5/1989 | Finnegan | 211/73 |
| 4,872,566 | A | | 10/1989 | Alsup | |
| 4,974,502 | A | * | 12/1990 | Murdock | 99/426 |
| 5,005,704 | A | | 4/1991 | Martin | |
| D334,509 | S | * | 4/1993 | Melvin | D7/504 |
| 5,203,493 | A | | 4/1993 | Moody | |
| D336,406 | S | * | 6/1993 | Wytiuk | D7/504 |
| 5,232,609 | A | * | 8/1993 | Badinier et al. | 249/102 |
| 5,487,330 | A | * | 1/1996 | Mooney | 99/425 |
| D371,047 | S | * | 6/1996 | Houyou | D7/504 |
| 5,628,245 | A | * | 5/1997 | Baze | 99/426 |
| D411,413 | S | * | 6/1999 | Pfingsten | D7/504 |
| 5,971,168 | A | * | 10/1999 | Proulx | 211/85.4 |
| 5,979,656 | A | * | 11/1999 | Northcott et al. | 206/564 |
| 6,019,224 | A | | 2/2000 | Rich | |
| D470,360 | S | * | 2/2003 | Stanco | D7/409 |
| 6,591,831 | B2 | | 7/2003 | Reynolds | |
| D489,938 | S | * | 5/2004 | Vipond | D7/504 |
| D499,607 | S | * | 12/2004 | Lyon | D7/504 |
| 7,097,039 | B2 | * | 8/2006 | Muis et al. | 206/564 |
| 7,258,246 | B2 | * | 8/2007 | Tingley | 220/507 |
| D563,166 | S | * | 3/2008 | Woolfolk et al. | D7/504 |
| 2005/0023234 | A1 | | 2/2005 | Head | |
| 2005/0279668 | A1 | * | 12/2005 | Nash et al. | 206/562 |
| 2008/0286431 | A1 | * | 11/2008 | Brown | 426/560 |

* cited by examiner

Primary Examiner—Joseph M Pelham
(74) Attorney, Agent, or Firm—Eric Cernyar (57) ABSTRACT A food container insert for holding tacos upright in a food container includes a plurality of pockets, oriented at a minor slope, to facilitate drainage of grease and juices from the taco filling away from the taco shell. Slits along the bottom of the pockets also facilitate the drainage of grease and juices from the taco filling away from the taco shell. The insert is suitable for both take-out food containers and chafing pans.

18 Claims, 7 Drawing Sheets

FOOD TRAY INSERT FOR HOLDING TACOS

FIELD OF THE INVENTION

This invention relates to food containers, and more particularly to containers for holding tacos.

BACKGROUND OF THE INVENTION

Tacos are tortillas, typically made of maize, corn or wheat flour, which provide a surface or enclosure for a topping or filling. Tacos have a long history. When Hernán Cortés (1485-1547) and the Conquistadores arrived in the New World, they witnessed the native inhabitants making flat corn breads and wrapping them around fish and other fillings. For centuries, tacos have been a staple of the Mexican diet. Reportedly, English-language taco recipes began appearing in 1914. In 1951, Taco Bell™'s founder, Glen Bell, reportedly invented the preformed, deep-fried, U-shaped crispy tortilla taco shell most familiar with the public today.

Tacos are made with all types of fillings. They are most frequently filled with spicy beef, pork, chicken, or other meat, along with cheese, salsa, lettuce, onions, tomatoes, beans, spices, sour cream, and/or other ingredients. Tacos also come in a variety of shapes, sizes, and preparations. A tostado is a flat toasted or fried tortilla. A quesadilla is a tortilla folded in half around a filling such as cheese while it is soft, that is then fried or toasted. A taquito is a tortilla that has been rolled up around the filling, and then baked or deep fried. A gordita, sometimes referred to as a pita taco, is a soft, un-fried taco with a thick tortilla. A chalupa is basically a fried gordita. An empanada is a tortilla that fully encloses the filling. The most familiar taco form is the pre-formed, U-shaped crispy tortilla taco shell, most typically anywhere from 5 to 7 inches long and 2¼ to 3½ inches in height.

For decades, restaurants have been serving folded or U-shaped tacos to their take-out customers in foam-based food containers. At the same time, food catering businesses frequently transport and serve folded or U-shaped tacos in deformable metal containers made of stainless steel commonly known as chafing dishes or chafing pans. Unfortunately, the tacos are frequently placed in these containers while laying down flat on their sides, or at an angle that is not well disposed to keeping the taco filling inside the shell. Furthermore, because the tacos are served or transported flat, the greases and juices from the taco filling often seep into the shell, making it soggy and susceptible to breakage.

SUMMARY OF THE INVENTION

To overcome these problems, several embodiments of a new and useful food tray insert for holding tacos are provided. In one embodiment, the food tray insert includes a plurality of pockets for holding crisp folded tacos in an upright position. In a more preferred embodiment, the food tray insert includes several pockets oriented at a minor slant to drain grease and juices from the taco filling away from the taco shell, in order to maintain its crispy form. In an even more preferred embodiment, slits along the bottom of the pockets facilitate the drainage of grease and juices from the taco filling away from the taco shell. Some embodiments are most appropriate for paper- or foam-based food trays or packages. Other embodiments are most appropriate for chafing pans.

While the most-preferred embodiment both holds the tacos upright and helps to drain the grease away, the invention is not necessarily limited to embodiments that achieve all of these advantages. A more detailed appreciation of the invention is provided in the following detailed description and the annexed sheets of drawings, which illustrate the invention.

DETAILED DESCRIPTION

Before the subject invention is described further, it is to be understood that the invention is not limited to the particular embodiments of the invention described below or depicted in the drawings. Many modifications may be made to adapt or modify a depicted embodiment without departing from the objective, spirit and scope of the present invention Therefore, it should be understood that, unless otherwise specified, this invention is not to be limited to the specific details shown and described herein, and all such modifications are intended to be within the scope of the claims made herein.

Figure 1:
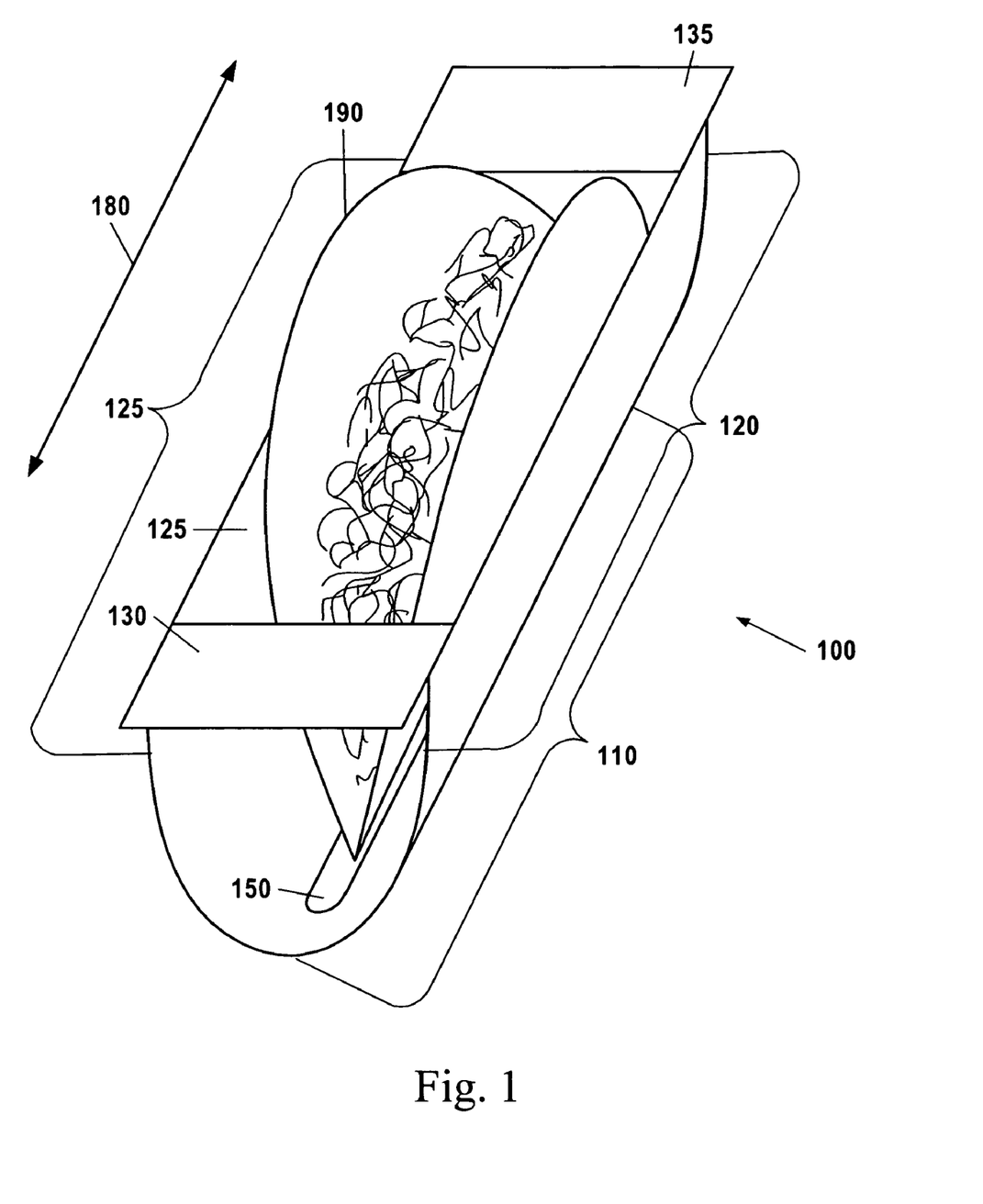
FIG. 1 is a perspective view of one embodiment of a taco-holding takeout container insert.

FIG. 1 illustrates one embodiment of a taco-holding takeout container insert 100. Insert 100 has a bottom support section 110, first and second side support sections 120 and 125, and flanges 130 and 135. Bottom support section 110 extends along a longitudinal dimension 180 of the taco holding insert 100 and supports the bottom of a folded or U-shaped taco 190. First side support section 120 extends upwardly from the bottom support section 110 and may support one side of the folded or U-shaped taco 190. Second side support section 125 extends upwardly from the bottom support section 110 and may support the other side of the folded or U-shaped taco 190. The two flanges 130 and 135 are joined to the first and second side support sections 120 and 125.

Figures 2, 3:
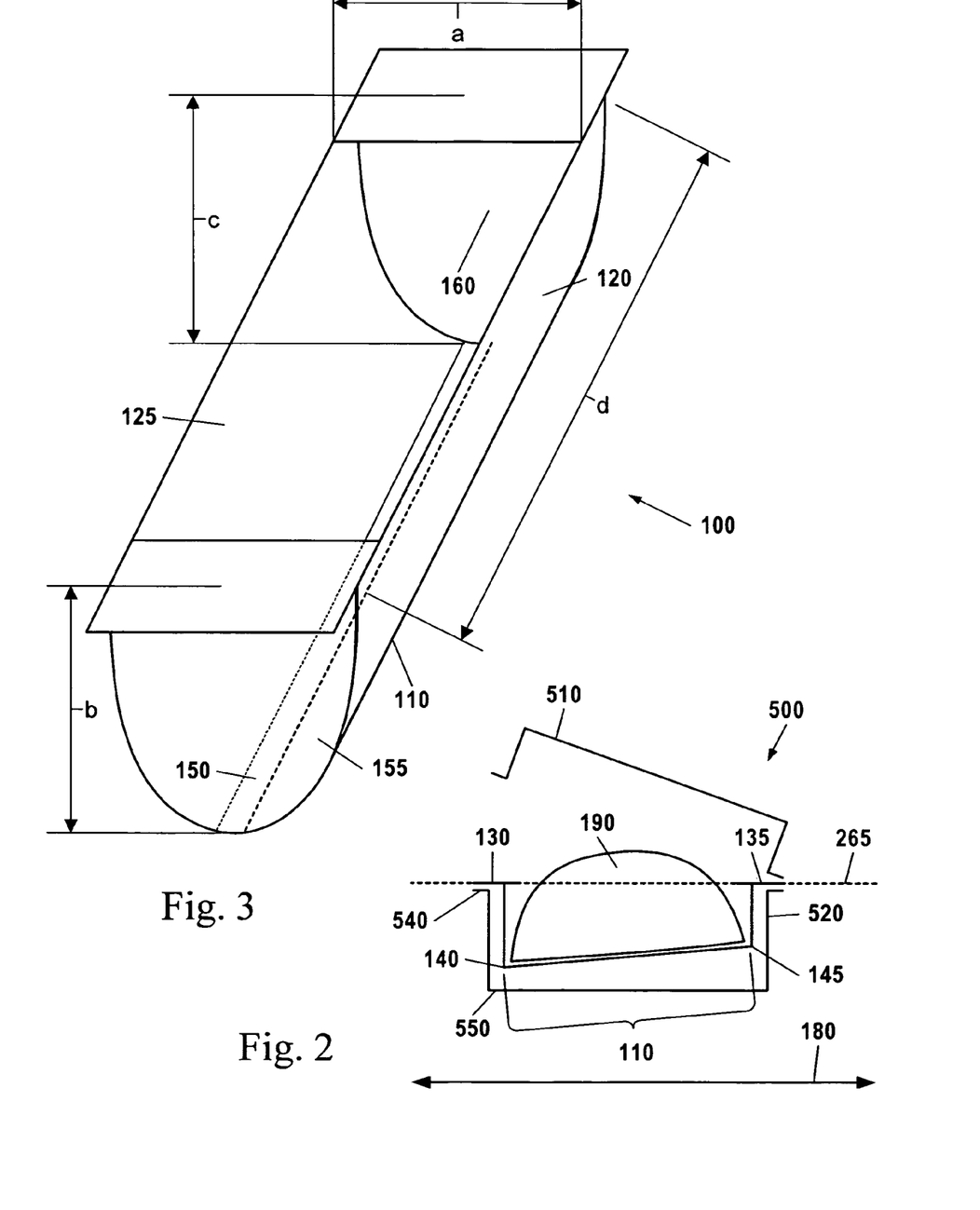
FIG. 2 is a side view of one embodiment of a taco-holding insert resting within a take-out container.
FIG. 3 is a dimensional diagram of the taco-holding takeout container insert of FIG. 1.

Optionally the taco holding insert 100 further comprises front and back wall sections 155 and 160—as shown in FIG. 2—that are joined to the first and second side support sections 120 and 125. In such embodiments, the front and back wall sections 155 and 160 comprise the ends of a trough-shaped enclosure formed by the first and second side support sections 120 and 125.

The taco holding insert 100 is preferably sized and dimensioned for a food container 500 (see FIGS. 2, 5) having a lower dish section 550 with a relatively flat floor 550, sidewall 535, and a peripheral rim 540. The flanges 130 and 135, which lie within the same plane 265, are adapted to rest upon opposite sides of the peripheral rim 540 of the lower dish section 520 of the food container 500 and support and elevate the taco holding insert 100 above the floor 550 of the lower dish section 520. In this manner, the taco holding insert 100 is adapted to hold a taco 190 inside the food container 500 above any juices that may collect along the floor 550 of the lower dish section 520.

It is preferable that the bottom support section 110 of the taco holding insert 100 be sloped at an angle, as shown in FIG. 2, along the longitudinal dimension 180 of the taco holding insert 100 with respect to the plane 265 of the flanges 130 and 135. In this manner, the taco holding insert 100 is adapted to drain juices from any ingredients filling the taco 190 outside the taco shell and onto the floor 550 of the lower dish section 520 of the food container 500. For example, the slope of the bottom support section 110 may be such that the front 140 of the bottom support section 110 is between ¼ and ¾ of an inch higher or lower than the back 145 of the bottom support section 110.

For embodiments with front and back wall sections 155 and 160 (FIG. 2), this sloping feature may be characterized as follows: the bottom support section 110 is sloped from the front wall section 155 to the back wall section 160, the slope being at a non-zero angle along the longitudinal dimension 180 of the taco holding insert 100 with respect to the plane 265 of the flanges 130 and 135.

Furthermore, it is preferred that there be a slit 150 along the bottom support section 110 of the taco holding insert 100 to facilitate the drainage of juices away from the taco 190 and onto the floor 550 of the lower dish section 520 of the food container 500. As shown in FIG. 1, this slit 150 may extend along most of the length of the bottom support section 110 of the taco holding insert 100, or, as shown in FIG. 2, all the way from the front wall section 155 to the back wall section 160.

FIG. 3 is a dimensional diagram of the taco-holding take-out container insert 100. An insert 100 designed for U-shaped tacos formed from a 6" tortilla should have a length d of at least 6 inches, α width a of about ¾ of an inch, and a depth that goes from about 1½ inch at the front of the container to about 1¼ inch at the back of the container.

The taco holding insert 100 may be formed from any suitable material or combination of materials. For example, the bottom support section 110 and first and second side support sections 120 and 125 may comprise a continuous, unitary sheet of paper (such as cardboard) or plastic material (such as polystyrene that helps to retain the warmth of the taco). Preferably, inserts made for take-out food containers will be made of highly insulating materials to help the tacos retain their heat. Furthermore, the flanges 130 and 135 are preferably substantially flat, although reinforcing ribs and other structures may be included for added strength. Keeping the flanges 130 and 135 substantially flat helps minimizes the escapage of heat from the container between the peripheral rim 540 of the lower dish section 520 and the peripheral rim 530 of the cover section 510.

Figure 4:
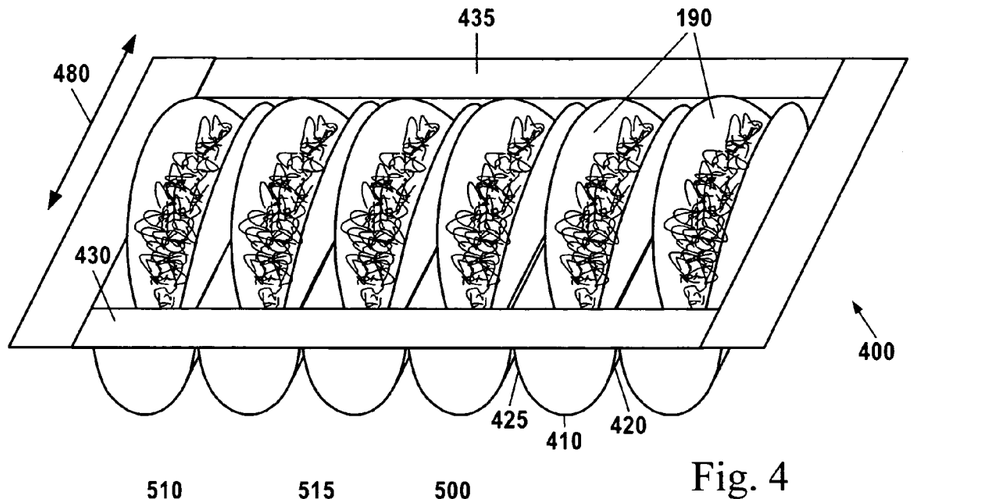
FIG. 4 is a perspective view of another embodiment of a taco-holding takeout container insert.
Figure 5:
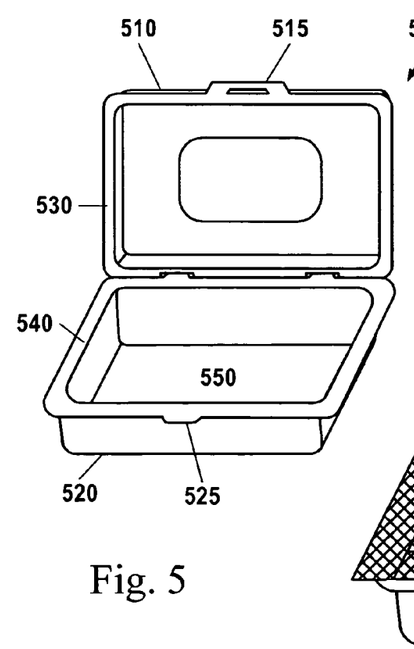
FIG. 5 is a perspective view of a take-out food container to which the taco-holding insert of FIG. 4 is adapted.
Figure 6:
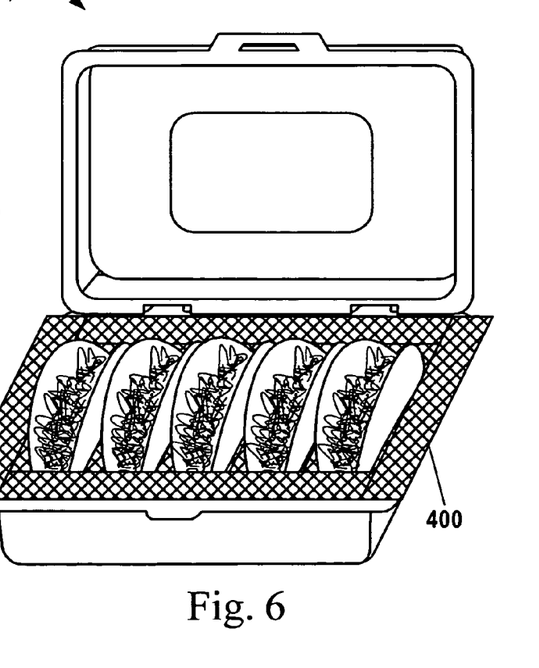
FIG. 6 is a perspective view of the taco-holding takeout container insert of FIG. 4 fitted onto the take-out food container of FIG. 5.

FIGS. 4-6 are perspective views of one embodiment of a multiple-taco-holding insert 400 sized and dimensioned for a food takeout container 500. The food container 500 has a lower dish section 520 and a cover section 510. The lower dish section 520 has a floor 550, a peripheral sidewall 520, a peripheral rim or lip 540, and a latching tongue 525. The cover section 510 has a peripheral rim or lip 530 adapted to mate with or overlay the rim 540 of the lower dish section 520. The cover section 510 also includes a complementary latch member 515 to receive the latching tongue 525.

It will be understood that the present invention is suitable for several different types of food containers—both conventional and custom-made—including those depicted in U.S. Pat. No. 3,935,962 to Shubert et al., U.S. Pat. No. 3,851,789 to Case et al., U.S Pat. No. 3,876,130 to Haase, U.S. Pat. No. 3,968,921 to Jewell, and U.S. Pat. No. 4,079,880 to Edwards, each of which is incorporated by reference.

The multiple taco-holding insert 400 provides a plurality of trough-shaped receptacles for holding a several tacos 190 in a substantially upright position. Each of the trough-shaped receptacles includes a bottom support section 410 extending along a longitudinal dimension 480 of taco holding insert 400 and first and second side support sections 420 and 425 extending upwardly from the bottom support section 410, each pair of first and second side support sections 420 and 425 adapted to support opposite sides of a folded or U-shaped taco.

The multiple taco-holding insert 400 further includes coplanar flanges 430 and 435—which may form part of a single coplanar flange that extends all the way around the upper periphery of the insert 400, as shown in FIG. 4—adapted to rest upon opposite sides of the peripheral rim 540 of the lower dish section 520 of the food container 500 and support and elevate the multiple taco holding insert 400 above the floor 550 of the lower dish section 520. In this manner, the multiple taco holding insert is adapted to hold tacos 190 inside the food container 500 above any juices that may collect along the floor 550 of the lower dish section 520.

Preferably, each of the bottom support sections 410 are sloped at an angle along the longitudinal dimension 480 of the taco holding insert 400 with respect to the plane of the flanges. In this manner, the multiple taco holding insert 400 is adapted to drain juices from any ingredients filling the tacos 190 outside the taco shells and onto the floor 550 of the lower dish section 520 of the food container 500.

Different embodiments of the multiple taco-holding insert 400 may be designed to hold different numbers of tacos, based upon variables such as how many tacos are desired to be held and the relative sizes of the tacos and the food container 500.

FIGS. 1, 2, and 4 depict embodiments in which the first and second side support sections 120 and 125 (or 420 and 425) curve upwardly from the bottom support section 110 (or 410), thereby forming a concave-shaped channel or trough for supporting the taco. In such embodiments, there is no distinct and definite transition from the bottom support section 110 (410) to the first and second side support sections 120 and 125 (420 and 425). But other, more linear and less parabolic embodiments are also contemplated.

Figure 7:
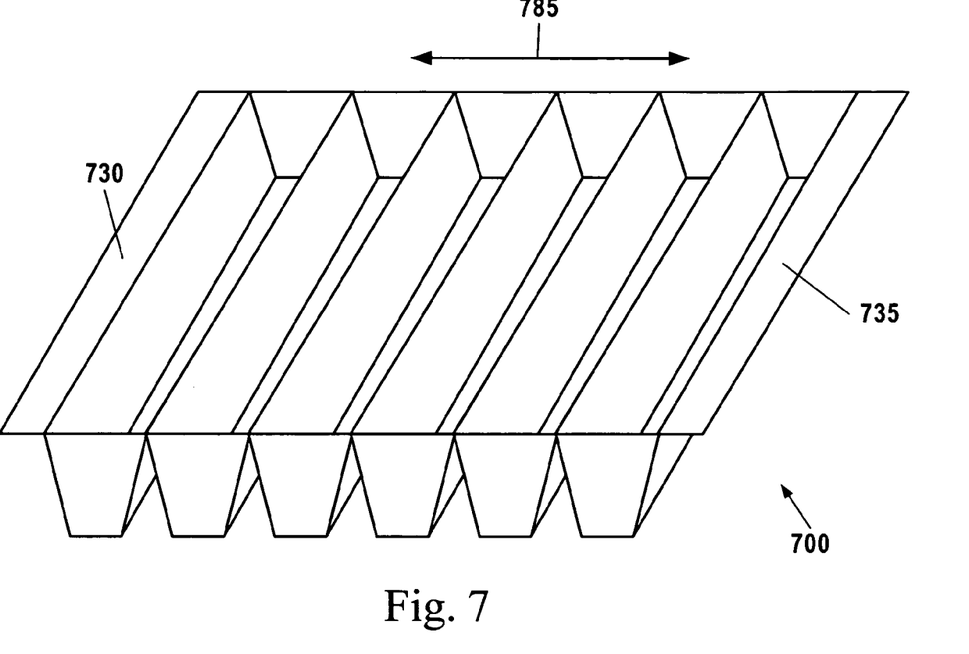
FIG. 7 is a perspective view of another embodiment of a taco-holding takeout container insert.
Figure 8:
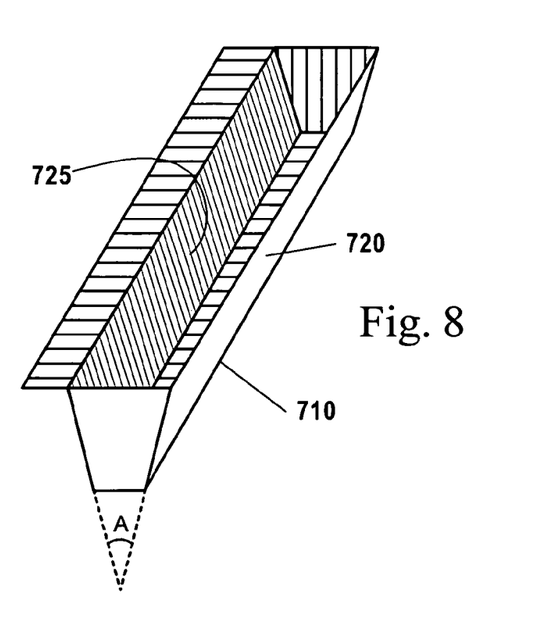
FIG. 8 is a perspective view of a portion of the taco holding insert of FIG. 7.

FIGS. 7 and 8 depict an alternative embodiment of a multiple-taco-holding takeout container insert 700 having first and second side support sections 720 and 725 that are clearly distinct from the bottom support section 710. Preferably, the planes tangent to the first and second side support sections 720 and 725 intersect each other at an angle A (FIG. 8) of between 15 and 60 degrees. In FIG. 8, the first and second side support sections 720 and 725 intersect the bottom support section 710 at angles that are symmetric with and opposite to one another. Stated another way, the angle bisecting the intersection angle A of the planes tangent to the first and second side support sections 720 and 725 is perpendicular to the plane of the flanges 730 and 735, whereby the taco holding insert is operable to hold the taco 190 in a substantially upright position.

The insert embodiments shown in FIG. 7 also differs from the embodiments shown in earlier figures in that the flanges 730 and 735 are placed on opposite sides of the lateral dimension 785 (as opposed to the longitudinal dimension 180) of the insert 700. It should be understood that whether the flanges extend only from opposite lateral or longitudinal dimensions, or from both dimensions (i.e., all the way around the periphery as in FIG. 4), is not critical unless specifically recited in the claims. Although not shown in FIGS. 7 or 8, it is contemplated that each of the troughs of the insert 700 should have a length of at least 6 inches, a width of about ¾ of an inch, and a depth that goes from about 1½ inch in front to about 1¼ inch in back.

Figure 9:
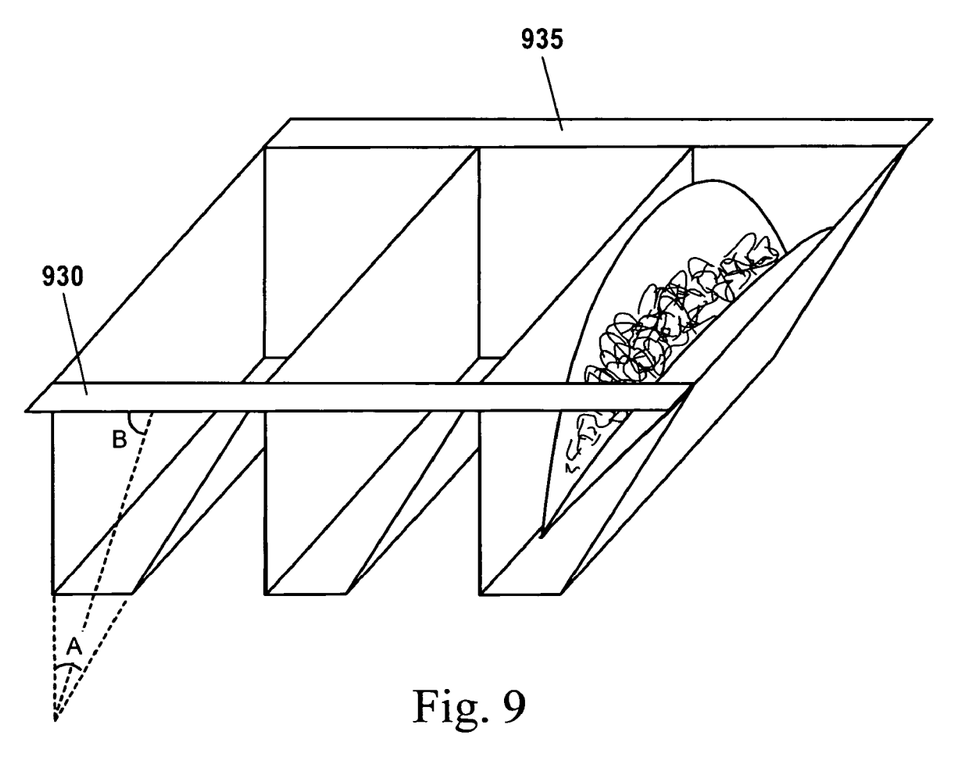
FIG. 9 is a perspective view of yet another embodiment of a taco-holding takeout container insert.

FIG. 9 depicts a modified version of a multiple-taco-holding takeout container insert 700 that holds tacos 190 at a slant. In this embodiment, the angle bisecting the intersection angle A of the planes tangent to the first and second side support sections intersects the plane of the flanges 930 and 935 at an angle B of between 45 and 75 degrees.

Figure 10:
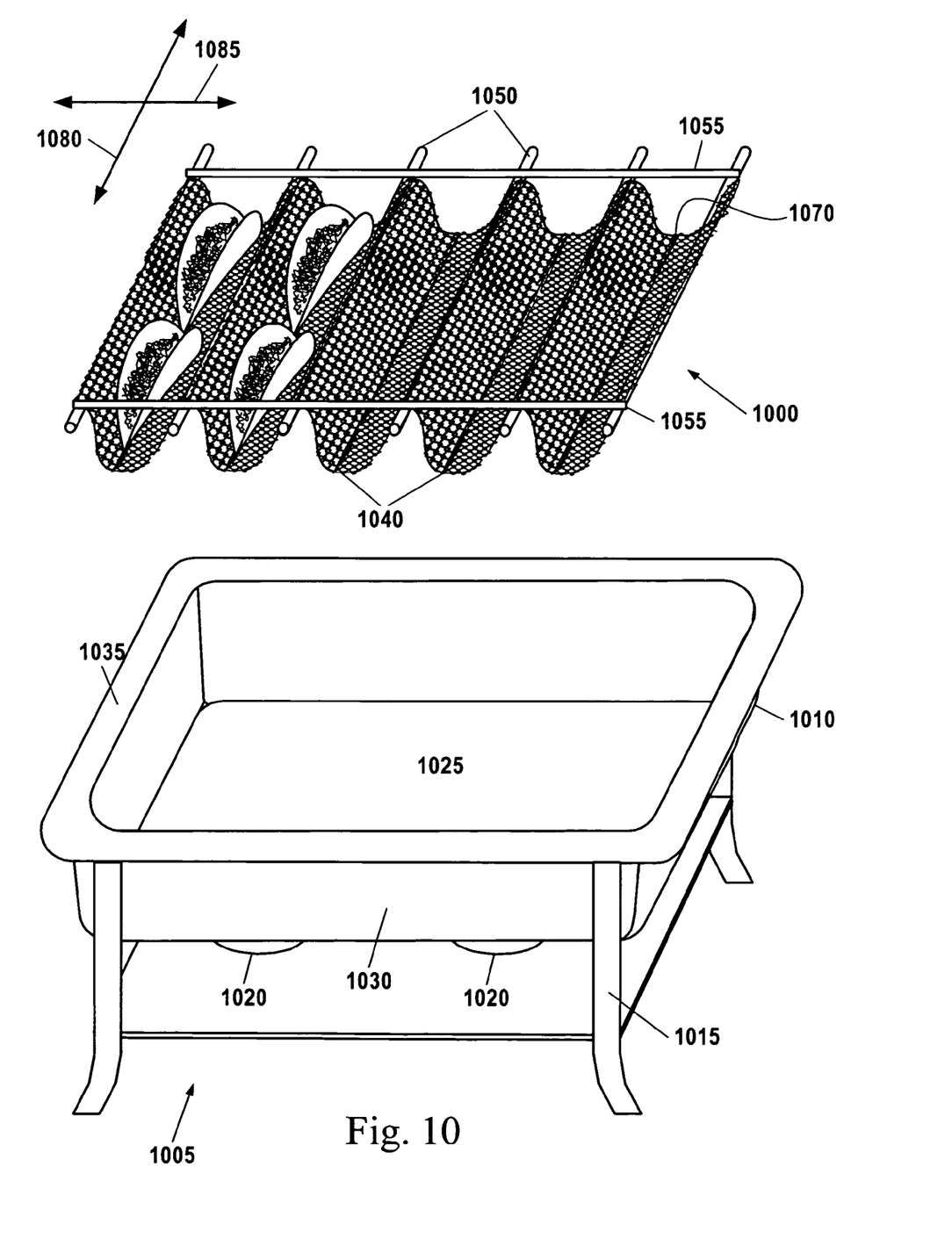
FIG. 10 is a perspective view of an embodiment of a taco-holding insert for a chafing pan dish.

FIG. 10 is a perspective view of a taco-holding insert 1000 for a chafing pan or dish 1005. Chafing dishes are widely used in the food service and catering fields. They are typically comprised of metal—such as stainless steel—and include a lower dish section 1010 and a cover (not shown) resting on a metal frame 1015. Sterno containers 1020 placed beneath the lower dish section 1010 keep the food warm. The lower dish section 1010 has a relatively flat bottom 1025, a sidewall 1030, and a peripheral rim or lip 1035.

In order to facilitate the transfer of heat from the heated chafing dish 1005 to the tacos, the taco-holding insert 1000 preferably comprises a metallic support structure for supporting a plurality of tacos in a relatively upright position. In FIG. 10, the metallic support structure comprises a plurality of rigid stainless steel rods 1050 oriented within the same plane along a longitudinal dimension 1080 and joined to two or more intersecting rigid stainless steel rods 1055 oriented along a lateral dimension 1085. The rods 1050 are long enough to reach and rest upon opposite sides of the peripheral rim 1035 of the lower dish section 1010 of the chafing dish 1000 to support and elevate the chafing dish insert 1000 above the bottom 1025 of the lower dish section 1010.

A flexible wire mesh 1070, reminiscent of a fireplace screen, is draped over the rods 1055, forming a taco-holding trough between each pair of adjacent rods 1055. Metal ties or other suitable fasteners may be used to tie the wire mesh to the rods 1050. The hanging wire mesh 1070 forms a plurality of bottom support sections 1040 extending along a longitudinal dimension 1080 of the taco holding insert 1000 for supporting the bottoms of a plurality of folded or U-shaped tacos. In this manner, the chafing dish insert 1000 is adapted to hold a taco 190 inside the chafing dish 1005 above the floor 1025 of the lower dish section 1010 and at a slope adapted to drain juices from any ingredients filling the tacos 190 outside the taco shells and onto the floor 1025 of the lower dish section 1010 of the chafing pan 1005.

Preferably, each of the bottom support sections 1040 is sloped at an angle along the longitudinal dimension 1080 of the taco holding insert 1000 with respect to the plane of the peripheral rim. A drawstring (not shown) may be woven through the backside of the wire mesh 1070, along the lateral dimension 1085. A slight tightening of the drawstring slightly will make the troughs shallower toward the back than they are at the front, causing the bottom support sections 1040 to slope along the longitudinal dimension 1080.

Figure 11:
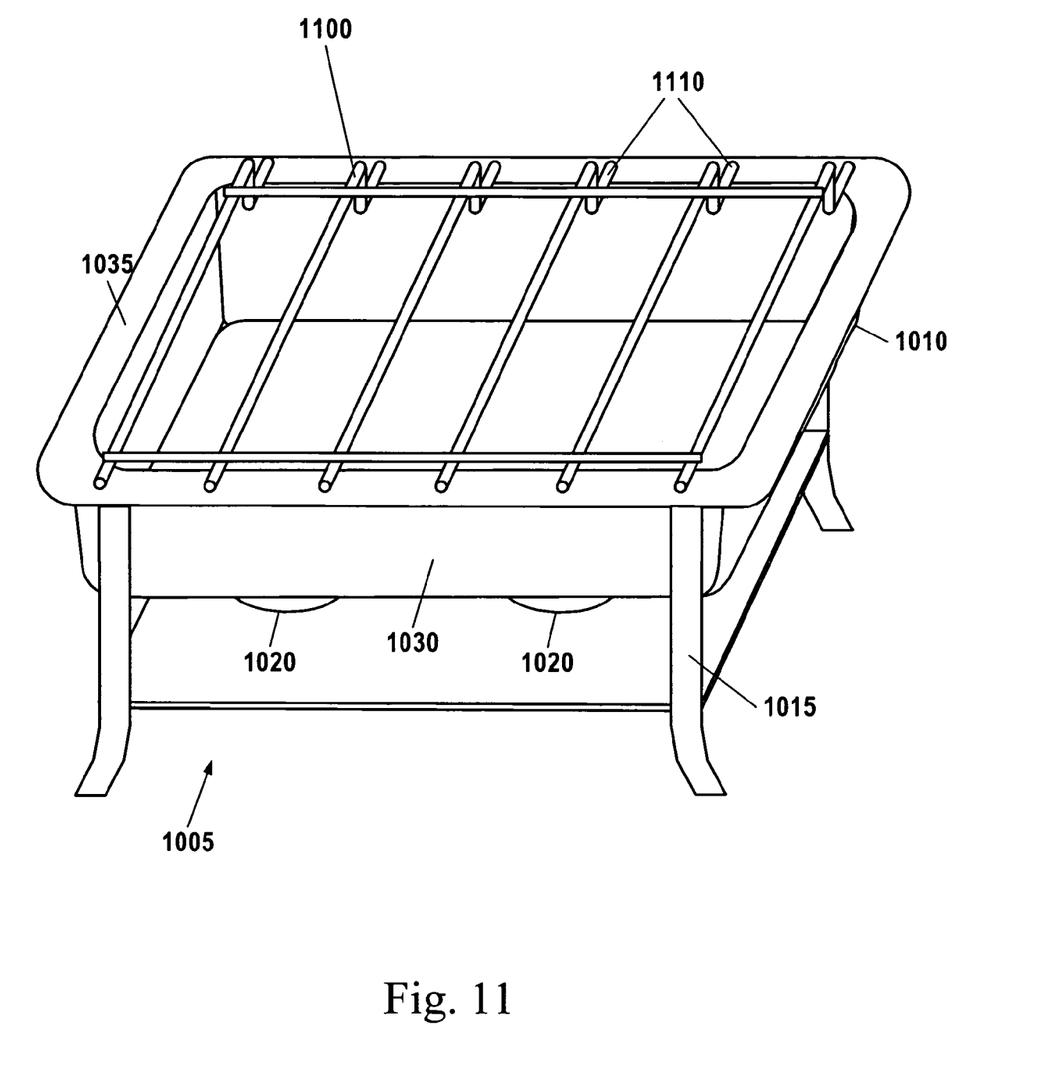
FIG. 11 is a perspective view of an alternative embodiment of a taco-holding insert for a chafing pan dish.

Alternatively, as shown in FIG. 11, the steel rod structure 1100 itself is designed to effect a slope to the troughs. In FIG. 11, elevating members 1110 have been added to the rods 1050 to orient the wire mesh (not shown) at a slope to facilitate drainage of taco juices.

A chafing dish insert 1000 designed for a large but conventional chafing pan bottom measuring approximately 12¾" wide by 20¾" long by 6" deep can have as many as 27 troughs and accommodate approximately 2 6-inch tacos per trough. Other embodiments of chafing pan dish inserts, not shown, include rigid wire frame structures and the paper and plastic embodiments presented earlier herein.

Although the foregoing specific details describe various embodiments of the invention, persons reasonably skilled in the art will recognize that various changes may be made in the details of the apparatus of this invention without departing from the spirit and scope of the invention as defined in the appended claims.

The present invention includes several independently meritorious inventive aspects and advantages. Unless compelled by the claim language itself, the claims should not be construed to be limited to structures that incorporate all of the inventive aspects, or enjoy all of the advantages, disclosed herein.

I claim:

1. A taco holding insert sized and dimensioned for a food container having a lower dish section with a relatively flat floor, sidewall, and a peripheral rim, the taco holding insert comprising:
   a sloped bottom support section extending along a longitudinal dimension of the taco holding insert for supporting the bottom of a folded or U-shaped taco;
   a first side support section extending upwardly from the bottom support section for supporting one side of a folded or U-shaped taco;
   a second side support section extending upwardly from the bottom support section for supporting the other side of the folded or U-shaped taco; and
   at least two coplanar flanges adapted to rest upon opposite sides of the peripheral rim of the lower dish section of the food container and support and elevate the taco holding insert above the floor of the lower dish section;
   wherein the sloped bottom support section is sloped at a non-zero angle along the longitudinal dimension of the taco holding insert with respect to the plane of the flanges wherein the angle is sufficient;
   to drain juices from any ingredients filling the taco outside the taco shell and onto the floor of the lower dish section of the food container whereby the taco holding insert is adapted to hold a taco inside the food container above any juices that may collect along the floor of the lower dish section.

2. The taco holding insert of claim 1, wherein the slope of the bottom support section is such that the front of the bottom support section is vertically displaced between ¼ and ¾ of an inch above or below the back of the bottom support section.

3. The taco holding insert of claim 1, wherein the bottom support section and first and second side support sections are comprised of metal.

4. The taco holding insert of claim 1, wherein the bottom support section and first and second side support sections comprise a continuous, unitary sheet of paper or plastic material.

5. The taco holding insert of claim 4, wherein the continuous, unitary sheet of material comprises polystyrene,
   whereby the polystyrene helps to retain the warmth of the taco.

6. The taco holding insert of claim 4, wherein the continuous, unitary sheet of material comprises cardboard.

7. The taco holding insert of claim 4, wherein the first and second side support sections curve upwardly from the bottom support section, thereby forming a concave-shaped channel or trough for supporting the taco.

8. The taco holding insert of claim 4, wherein the first and second side support sections lie within planes that intersect each other at an angle of between 15 and 60 degrees.

9. The taco holding insert of claim 8, wherein the plane bisecting the intersection angle of the planes tangent to the first and second side support sections is perpendicular to the plane of the flanges, whereby the taco holding insert is operable to hold the taco in a substantially upright position.

10. The taco holding insert of claim 8, wherein the plane bisecting the intersection angle of the planes tangent to the first and second side support sections intersects the plane of the flanges at an angle of between 45 and 75 degrees.

11. The taco holding insert of claim 1, further comprising:
   a plurality of bottom support sections extending along a longitudinal dimension of the taco holding insert for supporting the bottoms of a plurality of folded or U-shaped tacos;
   a plurality of first side support sections extending upwardly from the bottom support section, each first side support section adapted to support one side of a folded or U-shaped taco; and
   a plurality of second side support sections extending upwardly from the bottom support section, each second side support section adapted to support the other side of the folded or U-shaped taco.

12. The taco holding insert of claim 11, wherein each of the bottom support sections are sloped at an angle along the longitudinal dimension of the taco holding insert with respect to the plane of the flanges;
   whereby the multiple taco holding insert is adapted to drain juices from any ingredients filling the tacos outside the taco shells and onto the floor of the lower dish section of the food container.

13. A taco holding insert sized and dimensioned for a food container having a lower dish section with a relatively flat floor, sidewall, and a peripheral rim, the taco holding insert comprising:
   a bottommost section extending along a longitudinal dimension of the taco holding insert;
   a slit along the bottommost section of the taco holding insert dimensioned for seating the bottom of a folded or U-shaped taco slightly below the bottommost section and above the floor of the lower dish section and for facilitating the drainage of juices away from the taco and taco holding insert and onto the floor of the lower dish section of the food container;
   a first side support section extending upwardly from the bottommost section for supporting one side of a folded or U-shaped taco;
   a second side support section extending upwardly from the bottommost section for supporting the other side of the folded or U-shaped taco; and
   at least two coplanar flanges adapted to rest upon opposite sides of the peripheral rim of the lower dish section of the food container and support and elevate the taco holding insert above the floor of the lower dish section;
   whereby the taco holding insert is adapted to drain juices from any ingredients filling the taco outside the taco shell and onto the floor of the lower dish section of the food container and to hold a taco inside the food container above any juices that may collect along the floor of the lower dish section.

14. The taco holding insert of claim 13, further comprising front and back wall sections that are joined to the first and second side support sections, whereby the front and back wall sections comprise the ends of a trough-shaped enclosure formed by the first and second side support sections.

15. The taco holding insert of claim 14, wherein the bottommost section is sloped from the front wall section to the back wall section, the slope being at a non-zero angle along the longitudinal dimension of the taco holding insert with respect to the plane of the flanges;
   whereby the taco holding insert is adapted to drain juices from any ingredients filling the taco outside the taco shell and onto the floor of the lower dish section of the food container.

16. A chafing dish insert for holding crispy tacos, the chafing dish insert being sized and dimensioned to fit into a chafing dish having a lower dish section with a relatively flat bottom, a sidewall, and a peripheral rim, the chafing dish insert comprising:
   a metallic support structure for supporting a plurality of tacos in a relatively upright position;
   the metallic support structure including a plurality of bottom support sections extending along a longitudinal dimension of the taco holding insert for supporting the bottoms of a plurality of folded or U-shaped tacos;
   the metallic support structure including one or more rigid coplanar portions having sufficient spatial extent to reach and rest upon opposite sides of the peripheral rim of the lower dish section of the chafing dish to support and elevate the chafing dish insert above the bottom of the lower dish section; and
   each of the bottom support sections being sloped at a non-zero angle along the longitudinal dimension of the taco holding insert with respect to the plane of the peripheral rim wherein the angle is sufficient to drain juices from any ingredients filling the tacos outside the taco shells and onto the floor of the lower dish section of the chafing pan;
   whereby the chafing dish insert is adapted to hold a taco inside the chafing dish above the floor of the lower dish section.

17. The chafing dish insert of claim 16, wherein the metallic frame comprises a plurality of rigid stainless steel rods.

18. The chafing dish insert of claim 17, wherein the metallic frame comprises wire mesh hanging from the stainless steel rods.

* * * * *